United States Patent
Yoon

(10) Patent No.: US 9,317,859 B2
(45) Date of Patent: Apr. 19, 2016

(54) SYSTEM AND METHOD FOR RECOMMENDING KEYWORD BASED ON INDIRECT SELECTION

(75) Inventor: Do Yung Yoon, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 130 days.

(21) Appl. No.: 13/338,415

(22) Filed: Dec. 28, 2011

(65) Prior Publication Data

US 2013/0006905 A1      Jan. 3, 2013

(30) Foreign Application Priority Data

Dec. 28, 2010   (KR) .......................... 10-2010-0136521

(51) Int. Cl.
  *G06Q 30/02*   (2012.01)
  *G06N 99/00*   (2010.01)
  *G06N 5/04*   (2006.01)
(52) U.S. Cl.
  CPC .................. *G06Q 30/02* (2013.01); *G06N 5/04* (2013.01); *G06N 99/005* (2013.01)
(58) Field of Classification Search
  CPC ............................... G06N 5/04; G06N 99/005
  USPC .......................................................... 706/46
  See application file for complete search history.

(56) References Cited

U.S. PATENT DOCUMENTS

| 7,752,200 B2 | 7/2010 | Scholl et al. |
| 2008/0208841 A1 | 8/2008 | Zeng et al. |
| 2008/0275783 A1 | 11/2008 | Wee et al. |
| 2009/0228353 A1* | 9/2009 | Achan et al. ................... 705/14 |
| 2011/0264507 A1* | 10/2011 | Zhou et al. ................ 705/14.42 |

FOREIGN PATENT DOCUMENTS

| JP | 2007-220056 A | 8/2007 |
| JP | 2010-509671 A | 3/2010 |

(Continued)

OTHER PUBLICATIONS

Davison et al., Finding Relevant Website Queries, in Poster Proceedings of the Twelfth International World Wide Web Conference, May 2003.*

(Continued)

*Primary Examiner* — Stanley K Hill
*Assistant Examiner* — Robert H Bejcek, II
(74) *Attorney, Agent, or Firm* — Harness, Dickey & Pierce, P.L.C.

(57) ABSTRACT

A system to recommend a keyword includes a verifying unit to determine whether a keyword is a direct click keyword by referring to a click log and to determine whether the keyword is an indirect click keyword by referring to a third universal resource locator (URL) selected using the direct click keyword, wherein the direct click keyword is a keyword used to select a first URL on a computing device and the indirect click keyword is a keyword used to select a second URL on the computing device; and a keyword recommending unit to recommend the determined indirect click keyword. A method for recommending a keyword includes determining whether a keyword is a direct click keyword by referring to a click log; determining whether the keyword is an indirect click keyword by referring to a third URL selected using the direct click keyword; and recommending the determined indirect click keyword.

16 Claims, 13 Drawing Sheets

(56) References Cited

FOREIGN PATENT DOCUMENTS

| | | |
|---|---|---|
| KR | 10-0751560 | 8/2007 |
| KR | 10-0970323 | 7/2010 |

OTHER PUBLICATIONS

Bartz et al., Logistic Regression and Collaborative Filtering for Sponsored Search Term Recommendation, in Second Workshop on Sponsored Search Auctions, 2006.*

Beeferman et al., Agglomerative Clustering of a Search Engine Query Log, in Proceedings of the Sixth ACM SIGKDD International Conference on Knowledge Discovery and Data Mining, pp. 407-415, 2000.*

Cui et al., Probablistic Query Expansion Using Query Logs, in Proceedings of the Eleventh International Conference on World Wide Web, pp. 325-332, 2002.*

Jeh et al., SimRank: A Measure of Structural-Context Similarity, in Proc. of the Eigth ACM SIGKDD International Conference on Knowledge Discovery and Data Mining, Jul. 2002.*

Sahami et al., A Web-based Kernel Function for Matching Short Text Snippets, in International Conference on Machine Learning, 2005.*

Wen et al., Clustering User Queries of a Search Engine, in Proceedings of the Tenth International World Wide Web Conference, May 2001.*

Abhishek et al., Keyword Generation for Search Engine Advertising using Semantic Similarity between Terms., in Proceedings f the Ninth International Conference on Electronic Commerce, 2007.*

Fuxman et alia. Using the Wisdom of the Crowds for Keyword Generation. WWW 2008, Apr. 21-25, 2008, pp. 61-70.*

Ueda, R. et al. "Extraction method of hidden related terms based on temporal relation from query logs and its applications." *DEWS* 2008.

Fukushima, H. et al. "Development of a web search system helping the user to have search keywords." *IPSJ SIG Technical Report*, 2010.

Japanese Office Action dated Jul. 14, 2015 for corresponding JP Application No. 2011-285403.

\* cited by examiner

| Total of xxx,xxx keywords were viewed. | | | Store keyword of interest | Exclude selected keyword | | Excel download | |
|---|---|---|---|---|---|---|---|
| | | | Advertising product A | | | | |
| Keyword | Number of monthly views | Monthly aver. CTR | Competition state | Monthly display | Monthly aver. PPC | Number of monthly clicks | Predicted cost |
| Cute kids' clothes | 6,616 | 13.81% | 17 | 5 | 1,344 ₩ | 3,000 | 4,032,000 ₩ |
| Kids' clothes shopping mall | 11,315 | 10.07% | 15 | 5 | 341 ₩ | 3,158 | 1,076,878 ₩ |
| Kids' clothes | 27,502 | 7.95% | 15 | 5 | 320 ₩ | 3,316 | 1,061,120 ₩ |
| Second kids' clothes | 6,597 | 13.46% | 12 | 5 | 289 ₩ | 3,474 | 1,003,986 ₩ |
| ribbon tie | 459,995 | 0.93% | 19 | 5 | 2,201 ₩ | 3,474 | 7,994,032 ₩ |
| ... | ... | ... | ... | ... | ... | ... | ... |

| Total of xxx,xxx keywords were viewed. | | | Store keyword of interest | Exclude selected keyword | Excel download | |
|---|---|---|---|---|---|---|
| | | | Advertising product A | | | |
| Keyword ▶ | Number of monthly views ▶ | Starting price of bidding | Number of previous sales | number of monthly views | Previous first ranking bid | |
| Cute kids' clothes | 6,616 | 67,200 ₩ | 2 | 4.4 | 69,000 ₩ | |
| Kids' clothes shopping mall | 11,315 | 94,600 ₩ | 1 | 3.3 | 94,600 ₩ | |
| Kids' clothes | 27,502 | 279,000 ₩ | 0 | 1 | - | |
| Second kids' clothes | 6,597 | 92,000 ₩ | 1 | 1.7 | 92,000 ₩ | |
| ribbon tie | 459,995 | 332,000 ₩ | 1 | 3.8 | 332,000 ₩ | |
| ... | ... | ... | ... | ... | ... | |

SYSTEM AND METHOD FOR RECOMMENDING KEYWORD BASED ON INDIRECT SELECTION

CROSS-REFERENCE TO RELATED APPLICATION

This application claims priority from and the benefit under 35 U.S.C. §119(a) of Korean Patent Application No. 10-2010-0136521, filed on Dec. 28, 2010, which is incorporated by reference for all purposes as if fully set forth herein.

BACKGROUND

1. Field

The present disclosure relates to a system and method for recommending a keyword based on an indirect selection.

2. Discussion of the Background

Keyword advertising may refer to an advertising scheme of displaying an advertisement of a relevant company on a search result screen associated with a search word, for example, a keyword that is inputted or provided to a search site or a search engine. For example, if a user searches for keywords related to a term of "move", advertisements associated with a "door-to-door moving service", a "moving company", and the like may be displayed on a screen as a result of the search.

In such keyword advertising, an advertiser may purchase rights or license to a keyword associated with an advertisement of the advertiser and register the purchased keyword. Accordingly, the associated advertisement may be displayed or returned in response to the corresponding keyword being used on a search site or search engine. Accordingly, selection of keyword(s) to be purchased may affect advertising performance. For one or more advertisers, the advertising performance may be a factor in advertising earnings.

SUMMARY

Exemplary embodiments of the present invention provide a system and method for recommending a keyword.

Additional features of the invention will be set forth in the description which follows, and in part will be apparent from the description, or may be learned by practice of the invention.

Exemplary embodiments of the present invention provide a system to recommend a keyword including a verifying unit to determine whether a keyword is a direct click keyword by referring to a click log and to determine whether the keyword is an indirect click keyword by referring to a third universal resource locator (URL) selected using the direct click keyword, in which the direct click keyword is a keyword used to select a first URL on a computing device and the indirect click keyword is a keyword used to select a second URL on the computing device; and to recommend the determined indirect click keyword.

Exemplary embodiments of the present invention provide a method for recommending a keyword including determining whether a keyword is a direct click keyword by referring to a click log; determining whether the keyword is an indirect click keyword by referring to a third universal resource locator (URL) selected using the direct click keyword, in which the direct click keyword is a keyword used for selecting a first URL on a computing device and the indirect click keyword is a keyword used for selecting a second URL on the computing device; and recommending the determined indirect click keyword.

Exemplary embodiments of the present invention provide a method for recommending a keyword including determining whether a keyword is a direct click keyword by referring to a click log; determining whether the keyword is an indirect click keyword by referring to a third universal resource locator (URL) selected using the direct click keyword, in which the direct click keyword is a keyword used for selecting a first URL on a computing device and the indirect click keyword is a keyword used for selecting the a second URL on the computing device; computing a selection probability that the keyword is used for selecting the first URL or the second URL with the computing device; computing a similarity probability between the first URL and a second URL with the computing device; selecting a target indirect keyword from a plurality of indirect click keywords based on the selection probability; and recommending the determined indirect click keyword.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9 illustrates a user interface to provide viewed keywords to an advertiser according to an exemplary embodiment of the present invention.

DETAILED DESCRIPTION OF THE ILLUSTRATED EMBODIMENTS

Figure 1:
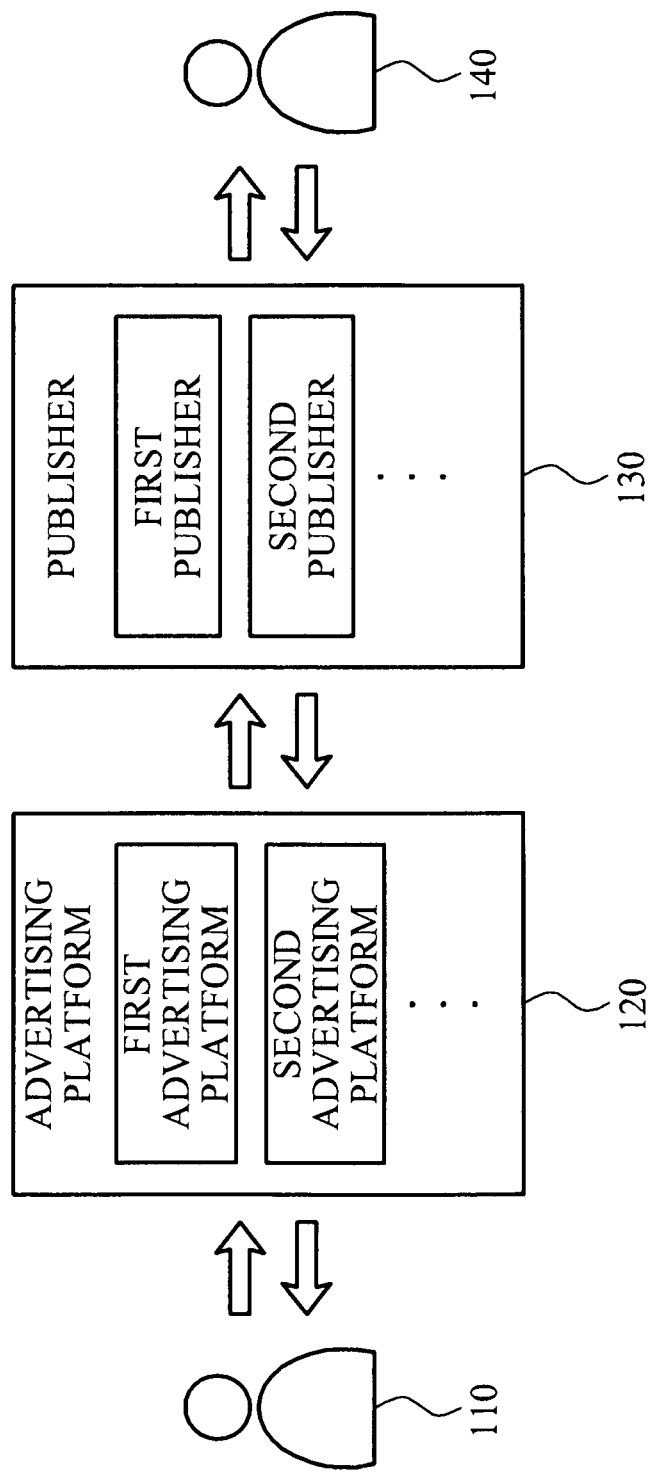
FIG. 1 is a diagram illustrating relationship between an advertiser, an advertising platform, a publisher, and a user according to an exemplary embodiment of the invention.

Exemplary embodiments now will be described more fully hereinafter with reference to the accompanying drawings, in which embodiments are shown. This present disclosure may, however, be embodied in many different forms and should not be construed as limited to the embodiments set forth herein. Rather, these exemplary embodiments are provided so that the present disclosure is thorough, and will fully convey the scope of the invention to those skilled in the art. Throughout the drawings and the detailed description, unless otherwise described, the same drawing reference numerals are understood to refer to the same elements, features, and structures. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). The relative size and depiction of these elements may be exaggerated for clarity, illustration, and convenience.

It will be understood that when an element is referred to as being "connected to" another element, it can be directly connected to the other element, or intervening elements may be present.

FIG. 1 is a diagram illustrating relationship between an advertiser, an advertising platform, a publisher, and a user according to an exemplary embodiment of the invention.

FIG. 1 shows an advertiser 110, an advertising platform 120, a publisher 130, and a user 140. Here, the advertiser 110 and the user 140 may refer to a terminal, for example, a personal computer (PC), a smart phone, and the like. The terminal may_be used by the advertiser 110 or the user 140. Arrow indicators of FIG. 1 may indicate that data may be transmitted and received using a wired/wireless network between a terminal used by the advertiser 110 and terminals used by the advertising platform 120, the publisher 130, and the user 140.

The advertising platform 120 may perform bidding operation for an advertisement of the advertiser 110, match an advertisement with a search word, sorting of advertisements or advertisers, providing an advertisement to the publisher 130, charging according to display of the advertisement, and the like. General technical description of the advertising platform 120, that is, description related to search advertisement and/or banner advertising platform may be understood from the conventional art and thus, further description will be omitted here.

The term "publisher" may refer to or correspond to the term "site" or a website. Description using the term "site" does not exclude a probability that the invention may be carried out in an application screen executed in a mobile terminal and the like, for example, an environment in which a website access of a general PC is not performed. Conversely, the term "site" may refer to or correspond to a "publishing site" or "publisher". That is, a site or a website may correspond to an individual publisher included in the publisher 130. The term "site" may refer to one or more types of websites that may display advertisements and may be provided to a user over a wired/wireless network, and may also include a single webpage that constitutes a website.

In addition, the term "display" of an advertisement may be interpreted to include providing contents, such as text, images, sound, video, hyperlinks, which may be related to a corresponding advertiser. The term "select" on the displayed advertisement may indicate that a circumstance desired to be achieved by the advertiser through the advertisement has occurred. For example, a mouse click on the provided contents corresponding to a website, such as the texts, the images, and the like, may refer to a "selection". Here, the circumstance intended by the advertiser may include, displaying a webpage associated with the advertiser to the user selecting the advertisement.

The publisher 130 may provide a website to the user 140, and may provide the user 140 with one or more webpages included in the website based on a search result. The search result may be provided in response to an inputted search word in a search engine or search website. The publisher 130 may receive one or more advertisements to be displayed on its webpages via the advertising platform 120 and provide the advertisements to the user 140. Also, the publisher 130 may transfer a search word inputted by the user 140 to the advertising platform 120, and may receive an advertisement related to the search word from the advertising platform 120. The received advertisement may be provided to the user 140 as a search result.

The publisher 130 may provide a route, for example, a screen via which the user 140 may receive the advertisement. In a general online environment, advertisements may be provided via websites. Here, one or more advertising platforms included in the advertising platform 120 may display an advertisement through at least one publisher included in the publisher 130. Also, one or more publishers may provide the user 140 with at least one service, such as an integrated search, a keyword search, a blog service, and the like. Services provided by the publishers may be provided over a wired/wireless network, including displaying of the advertisement.

The user 140 may perform a search by inputting a search word into a service offered by the publisher 130. The publisher 130 may be a search engine of providing a search result associated with the search word, or may be an entity to receive the search word and display a corresponding service providing webpage to the user 140.

Figure 2:
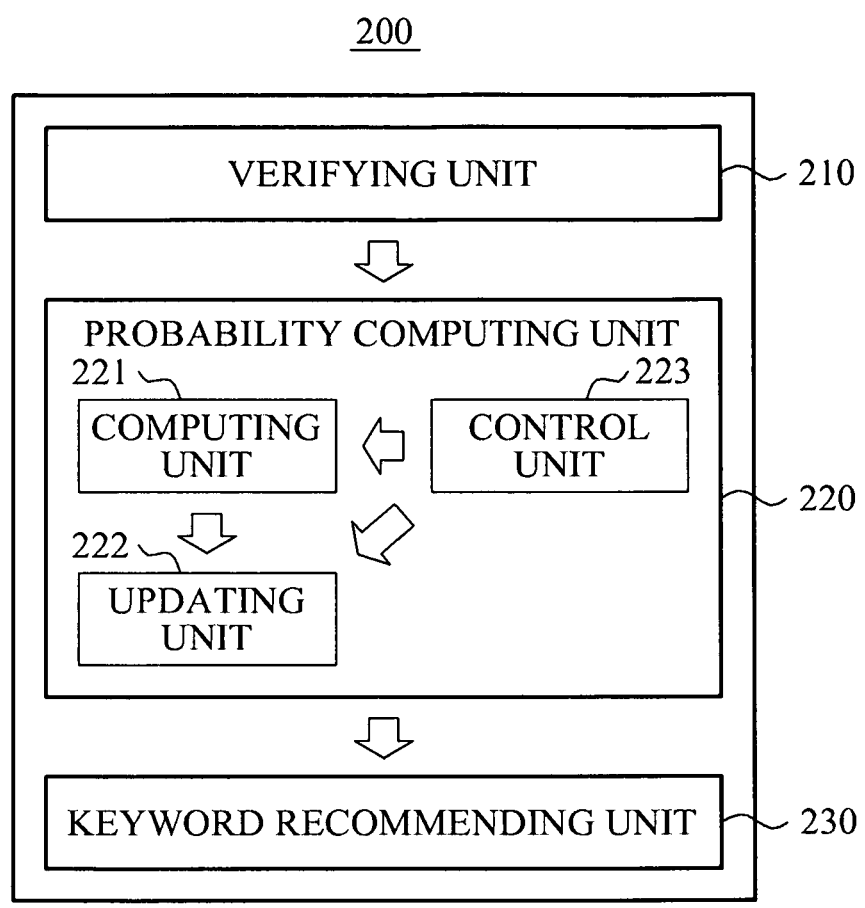
FIG. 2 is a block diagram illustrating a configuration of a keyword recommending system according to an exemplary embodiment of the invention.

FIG. 2 is a block diagram illustrating a configuration of a keyword recommending system according to an exemplary embodiment of the invention.

The keyword recommending system 200 may be included in at least one advertising platforms that may be included in the advertising platform 120 of FIG. 1. Accordingly, the keyword recommending system 200 may be operated in association with at least one advertising platform. Further, the keyword recommending system 200 may recommend one or more keywords to the advertiser 110 of FIG. 1. As shown in FIG. 2, the keyword recommending system 200 may include a verifying unit 210, a probability computing unit 220, and a keyword recommending unit 230. The probability computing unit 220 may be optionally added.

The keyword recommending system 200 may provide one or more indirect click keywords through the keyword recommending unit 230. Indirect click keywords may be verified or determined by the verifying unit 210. Also, the keyword recommending system 200 may select at least one indirect click keyword from among a plurality of indirect click keywords based on a probability computed by the probability computing unit 220, and recommend or provide at least one indirect click keyword.

The verifying unit 210 may verify or determine a direct click keyword by using or referring to a click log to determine whether the keyword was associated with the advertisement of the advertiser. The verifying unit 210 may also verify or determine an indirect click keyword, which may be verified or determined using a URL that does not correspond to the advertisement of the advertiser if using the direct click keyword. The direct click keyword may also be used to select a URL corresponding to an advertisement belonging to the advertiser 110 of FIG. 1 (hereinafter referred to as "advertisement"). The indirect click keyword may be used to select a different URL, which does not correspond to the advertisement of the advertiser. The indirect click keyword may include at least one keyword among remaining keywords, excluding the direct click keyword.

For example, the verifying unit 210 may verify or determine, as the direct click keywords by referring to the click log, if the keywords used in a search corresponds to a selected URL of the advertisement as a search result. Here, the verifying unit 210 may verify URLs selected using the direct click keyword by using or referring to the click log, and may verify or determine other keywords used to select the verified URLs.

That is, the direct click keyword may indicate a keyword used to select the URL of the advertisement belonging to the advertiser or a first URL. The indirect click keyword may indicate a keyword that is not used to select the URL of the advertisement, but is used to select a different URL or a second URL. The second URL may have a similar attribute to the first URL. The second URL may be an advertisement of a different advertiser or source. Further, the direct click keyword may also be used to select the URL of an advertisement that does not belong to the advertiser, or a third URL. In other words, there may be some probability that the indirect click keyword may be used to select the URL of the advertisement of the advertiser or a fourth URL.

The probability computing unit 220 may compute a selection probability of the URL of the advertisement being selected with respect to the direct click keyword and the indirect click keyword. That probability computing unit 220 may compute probabilities of keywords used to select the URL of the advertisement of the advertiser. As the selection probability for the direct keyword increases, the advertising performance of the advertisement may further increase.

The probability computing unit 220 may compute the selection probability based on a rate the first URL and the second URL being selected with respect to the direct click keyword and the indirect click keyword. Further, the probability computing unit 220 may compute a similarity probability between the first URL and the second URL. Here, the similarity probability may be computed based on a rate the first URL and the second URL are selected by a plurality of searchers using the same or similar keywords. The rate at which the first URL and the second URL are selected may be determined by using or referring to the click log.

For example, if 100 searchers performed searches using the same keyword A, and if out of the 100 searchers, first 50 searchers select a first URL, and the remaining 50 searchers select a second URL, a probability that a searcher who performs a search using the keyword A selects the first URL or the second URL may be 50%. That is, a probability that the first URL is similar to the second URL may be 100%. A similarity probability between URLs that cannot be simultaneously selected using any keyword may be 0%. That is, the probability computing unit 220 may compute the selection probability that the first URL may be selected with respect to the direct click keyword and the indirect click keyword. The respective selection probability may be based on the similarity probability between the first URL and the second URL, and a rate of each URL that is selected with respect to the direct click keyword and the indirect click keyword.

In addition, the probability computing unit 220 may include a computing unit 221, an updating unit 222, and a control unit 223.

The computing unit 221 may compute the selection probability based on a rate of the first URL and a rate of the second URL that are selected with respect to the direct click keyword and the indirect click keyword. Further, the computing unit 221 may compute a similarity probability between the first URL and the second URL. The similarity probability is described above and thus, further description will be omitted here.

The updating unit 222 may update the similarity probability based on the selection probability computed by the computing unit 221.

The control unit 223 may control the computing unit 221 and the updating unit 222 to repeat computation of the selection probability and updating of the similarity probability. The computations may be repeated for a reference number of times.

That is, instead of terminating a computation if the computing unit 221 computes the selection probability, the control unit 223 may control the updating unit 222 to update the similarity probability based on the selection probability and control the computing unit 221 to re-compute the selection probability based on the updated similarity probability.

A selection probability that a reference URL may be selected with respect to one or more keywords will be described with reference to FIG. 10 and FIG. 11.

The keyword recommending unit 230 may provide or recommend an indirect click keyword. The keyword recommending unit 230 may select at least one indirect click keyword from a plurality of indirect click keywords based on the selection probability and then provide or recommend the selected indirect click keyword to the advertiser. For example, the keyword recommending unit 230 may select a reference number of indirect click keywords and provide the selected number of indirect click keywords in a descending order of selection probability. The reference number of indirect click keywords may be provided by the keyword recommending system 200 or the advertiser. Here, information associated with the direct click keyword and the indirect click keyword may be displayed on an advertiser webpage assigned to the advertiser.

As described above, the selection probability may refer to probabilities that a keyword may be used to select the first URL and thus, the advertising effect may increase according to an increase in the selection probability. Further, the keyword recommending unit 230 may recommend one or more keywords, which may have at least a reference selection probability.

The keyword recommending system 200 may be a system to recommend a keyword based on the first URL, but is not limited thereto. The keyword recommending system 200 may also recommend a keyword to general users using a search service, as well as the advertiser through a system expansion.

Similar to FIG. 2, the keyword recommending system 200 according to another exemplary embodiment of the invention may include the verifying unit 210, the probability computing unit 220, and the keyword recommending unit 230. The probability computing unit 220 may be optionally added. For example, the keyword recommending system 200 may provide or recommend at least one indirect click keyword, which may be verified by the verifying unit 210, through the keyword recommending unit 230. Also, the keyword recommending system 200 may select at least one indirect click keyword from among a plurality of indirect click keywords based on a probability computed by the probability computing unit 220, and may provide or recommend the selected indirect click keyword.

The verifying unit 210 may verify or determine a direct click keyword by referring to a click log to determine whether the keyword was associated with a URL of a user. The verifying unit 210 may also verify or determine an indirect click keyword, which is verified or determined using a URL that does not correspond to the URL of the user if using the direct click keyword. The direct click keyword may be used to select a URL of a user. The indirect click keyword may be used to selecting a different URL that does not correspond to the URL of the user. Here, the URL of the user may include at least one of a URL input from the user and/or a URL selected by the user. The URL that does not correspond to the URL of the user may include a URL input from a different user/source and/or a URL selected by the different user/source. For example, if a user A receives a search result in response to a search using a keyword B and then selects a URL from the search result, the verifying unit 210 may determine the selected URL as the URL associated with the user and determine selection of the URL is associated with the direct click keyword by using or referring to the click log. If user A selects a different URL, one that does not correspond to the user, then the verifying unit 210 may determine that the selected URL is associated with the indirect click keyword. Further, the direct click keyword may also be determined as the keyword inputted by the user, without the use of the click log.

The probability computing unit 220 may compute a selection probability that the URL of the user may be selected with respect to the direct click keyword and the indirect click keyword. The probability computing unit 220 may compute the selection probability based on a rate of the first URL and the second URL that are selected with respect to the direct click keyword and the indirect click keyword, and a similarity probability between the URL of the user or fifth URL and the URL of a different user/source or a sixth URL.

Here, the probability computing unit 220 may include a computing unit 221, an updating unit 222, and a control unit 223. The computing unit 221 may compute the selection probability based on a rate of the fifth URL and the sixth URL that are selected with respect to the direct click keyword and the indirect click keyword, and the similarity probability between the fifth URL and the sixth URL. The updating unit 222 may update the similarity probability based on the selection probability computed by the computing unit 221. The control unit 223 may control the computing unit 221 and the updating unit 222 to repeat computation of the selection probability and update the similarity probability by a reference number of times.

A method for computing a selection probability that a reference URL may be selected with respect to a keyword is described above and will be further described with reference to FIG. 10 and FIG. 11.

The keyword recommending unit 230 may provide or recommend one or more indirect click keywords. The keyword recommending unit 230 may select at least one indirect click keyword from a plurality of indirect click keywords based on the selection probability, and then provide or recommend the selected indirect click keyword to the user. For example, the keyword recommending unit 230 may select a reference number of indirect click keywords and provide the selected number of indirect click keywords in a descending order of selection probability. The reference number of indirect click keywords may be provided by the keyword recommending system 200 or the advertiser.

FIG. 3, FIG. 4, FIG. 5, FIG. 6, FIG. 7, and FIG. 8 illustrate examples of a screen displaying a user interface provided from an advertiser page.

Figure 3:
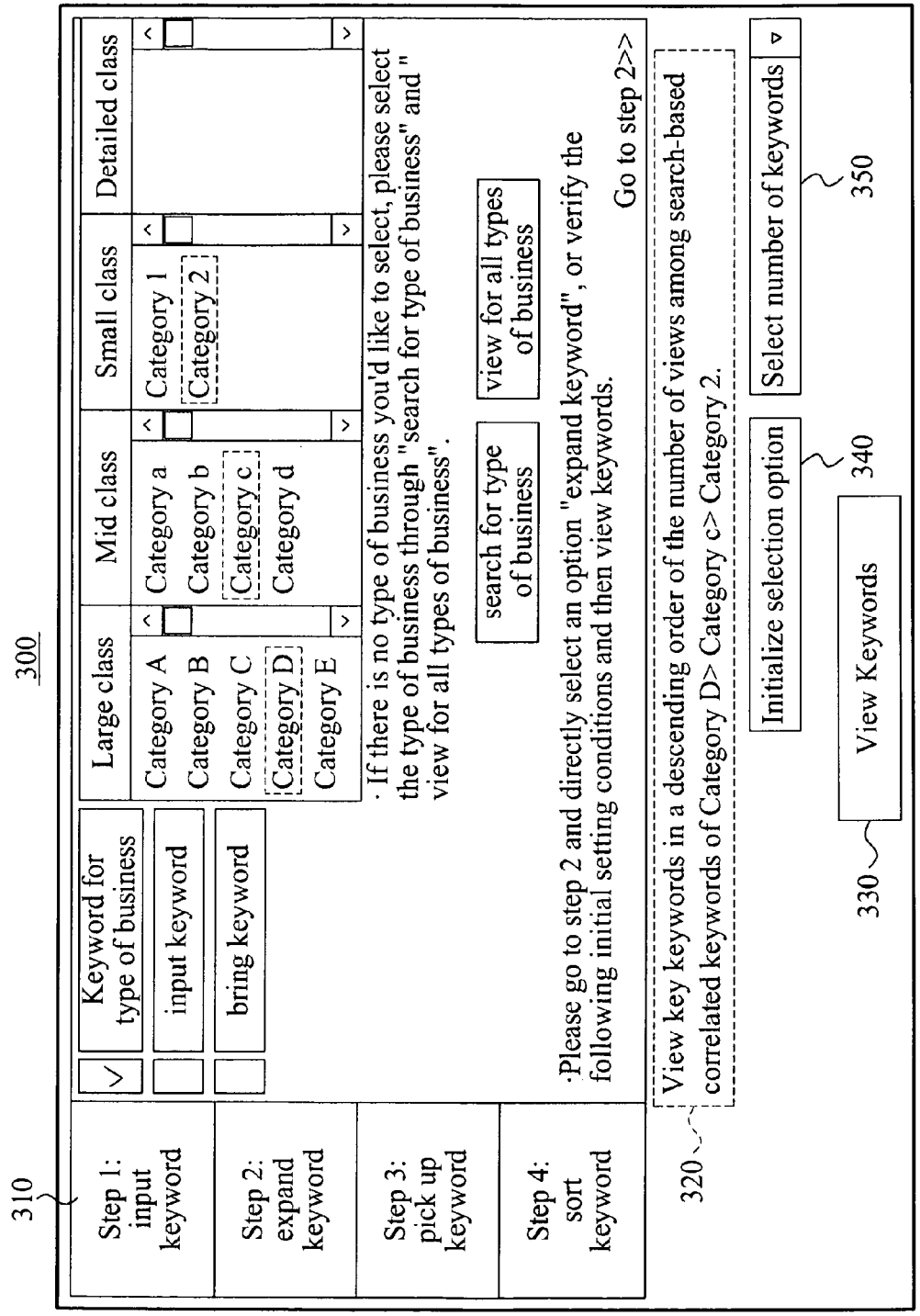
FIG. 3 illustrates a user interface to receive a type of business according to an exemplary embodiment of the invention.

FIG. 3 illustrates a user interface to receive a type of business according to an exemplary embodiment of the invention.

As shown in FIG. 3, screen 300 refers to an advertiser webpage in which an advertiser may modify a scope of a keyword used to retrieve or display an advertisement. In "step 1: input keyword" 310, the advertiser may select at least one of an option "keyword for type of business", an option "input keyword", and an option "bring keyword". Here, the screen 300 shows an example in which a user interface displays "large class/mid class/small class/detailed class" for the type of business if the advertiser selects the option "keyword for type of business". In this case, information associated with the type of business selected by the advertiser or information associated with reference keywords with respect to the corresponding type of business may be provided to the keyword recommending system 200 of FIG. 2 through the advertiser page.

Figure 4:
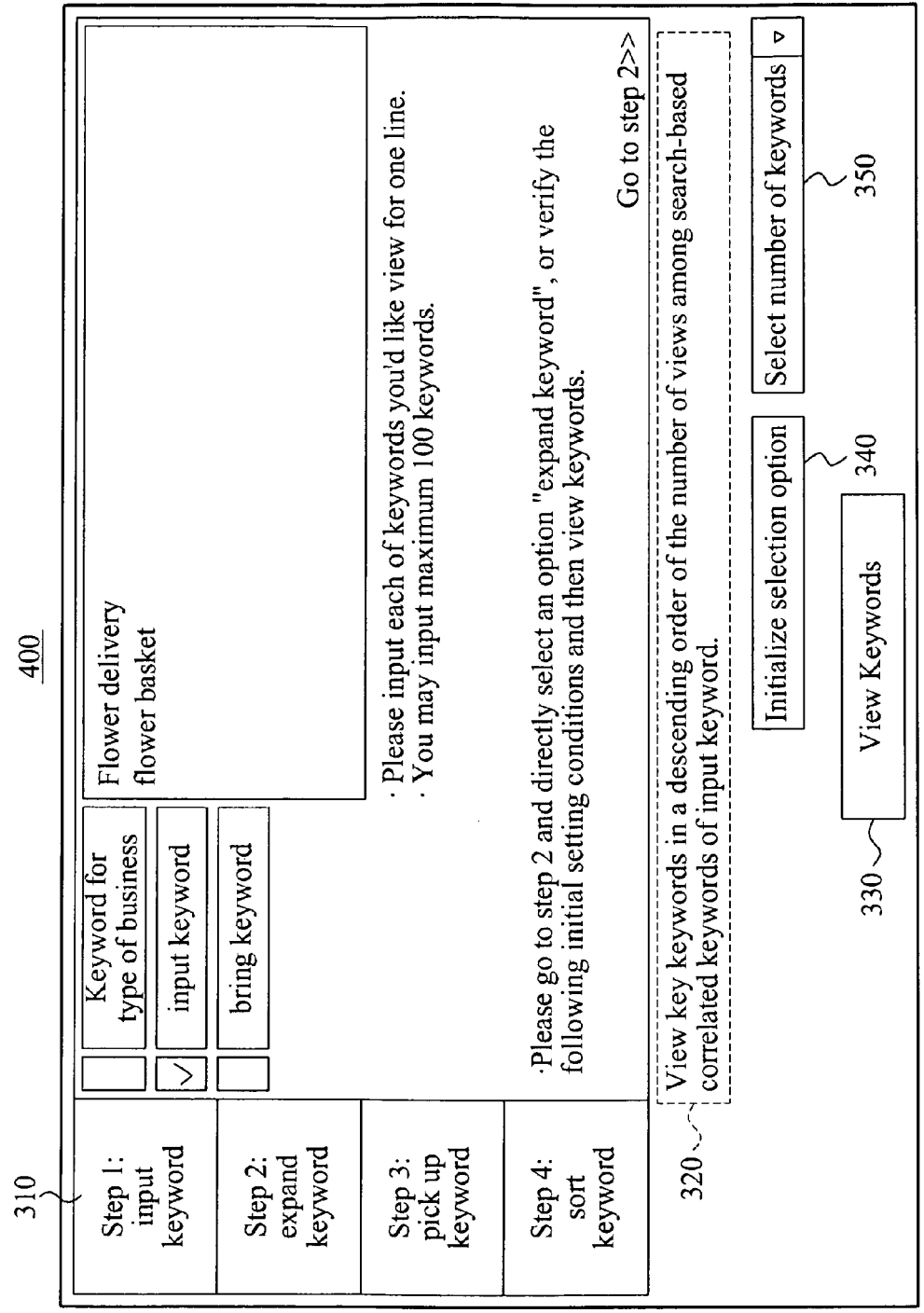
FIG. 4 illustrates a user interface to receive a keyword from an advertiser according to an exemplary embodiment of the invention.

FIG. 4 illustrates a user interface to receive a keyword from an advertiser according to an exemplary embodiment of the invention.

The screen 400 refers to an advertiser webpage in which an advertiser may modify a scope of a keyword used to retrieve or display an advertisement. In "step 1: input keyword" 310, the advertiser may select at least one of an option "keyword for type of business", an option "input keyword", and an option "bring keyword". Here, the screen 400 shows an example in which a user interface displays an input text field to receive one or more keywords if the advertiser selects the option "input keyword". In this case, information associated with keywords inputted by the advertiser may be provided to the keyword recommending system 200 through the advertiser page.

Figure 5:
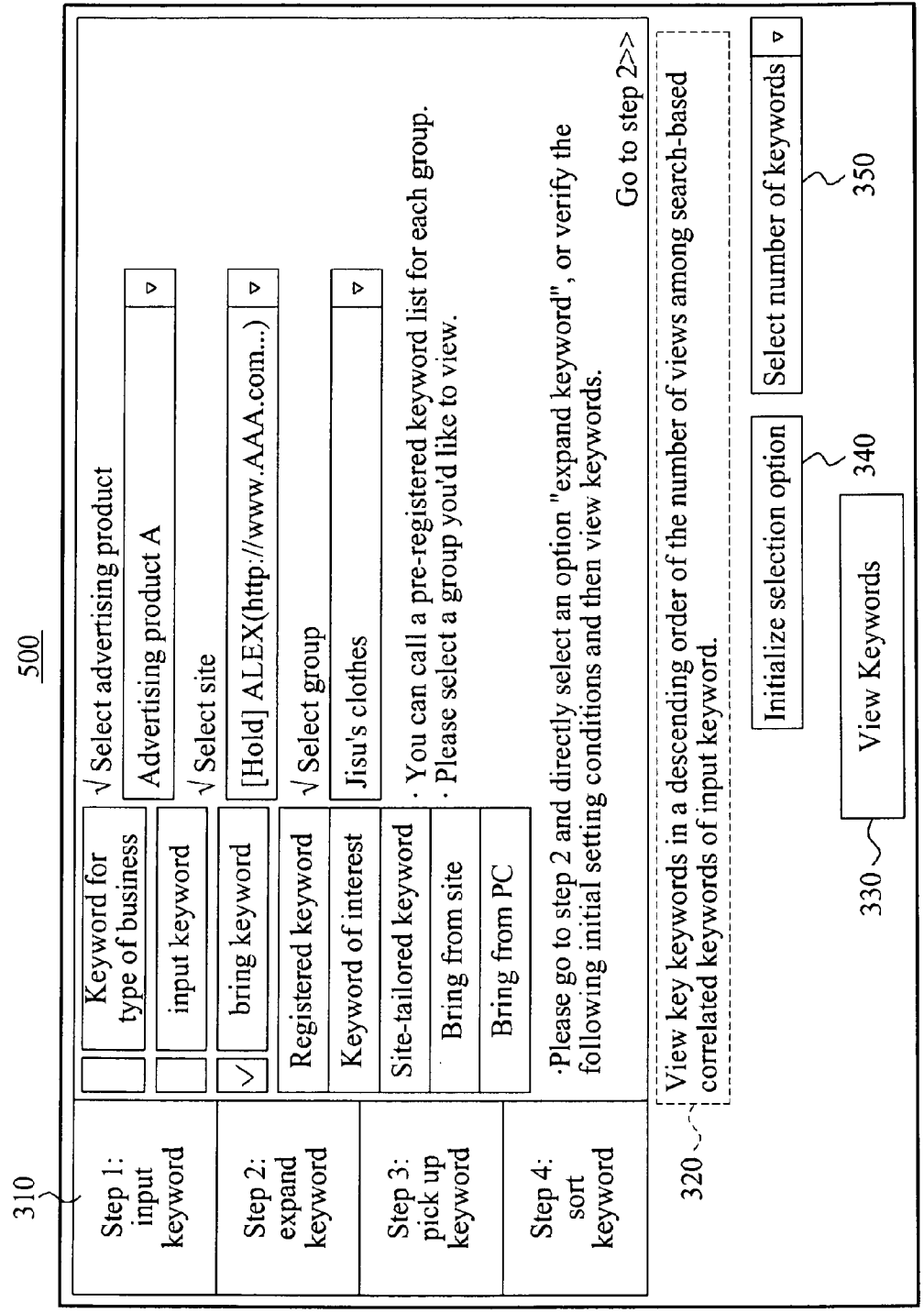
FIG. 5 illustrates a user interface to receive a keyword list according to an exemplary embodiment of the invention.

FIG. 5 illustrates a user interface to receive a keyword list according to an exemplary embodiment of the invention.

Screen 500 refers to an advertiser webpage in which an advertiser may modify a scope of a keyword used to retrieve or display an advertisement. In "step 1: input keyword" 310, the advertiser may select at least one of an option "keyword for type of business", an option "input keyword", and an option "bring keyword". Here, the screen 500 shows a user interface that is displayed if the advertiser selects the option "bring keyword" and additionally selects option "register keyword" among the available options. That is, a user interface to enable the advertiser to select a keyword list for one or more groups is displayed on the screen 500. In this case, information associated with keywords included in the selected keyword list may be provided to the keyword recommending system 200 of FIG. 2 through the advertiser page.

Also, if the advertiser selects an option "keyword of interest", a user interface to select a desired list from among lists of keywords of interest, which may be pre-stored by the advertiser or received through a third party, may be displayed on the advertiser page. If the advertiser selects an option "site-tailored keyword", a user interface to receive an input or a selection on an address of a reference website from the advertiser may be displayed on the advertiser webpage in order to limit a keyword tailored for a site selected by the user. In addition, if the advertiser selects an option "bring from site", the user interface may be displayed on the advertiser page in order to extract and provide a major keyword by crawling a website selected by the advertiser. If the advertiser selects an option "bring from PC", a user interface to receive a selection on a file stored in a terminal of the advertiser may be displayed on the advertiser page. Even in this case, information associated with keywords verified through each option may be provided to the keyword recommending system 200 of FIG. 2 through the advertiser page.

Figure 6:
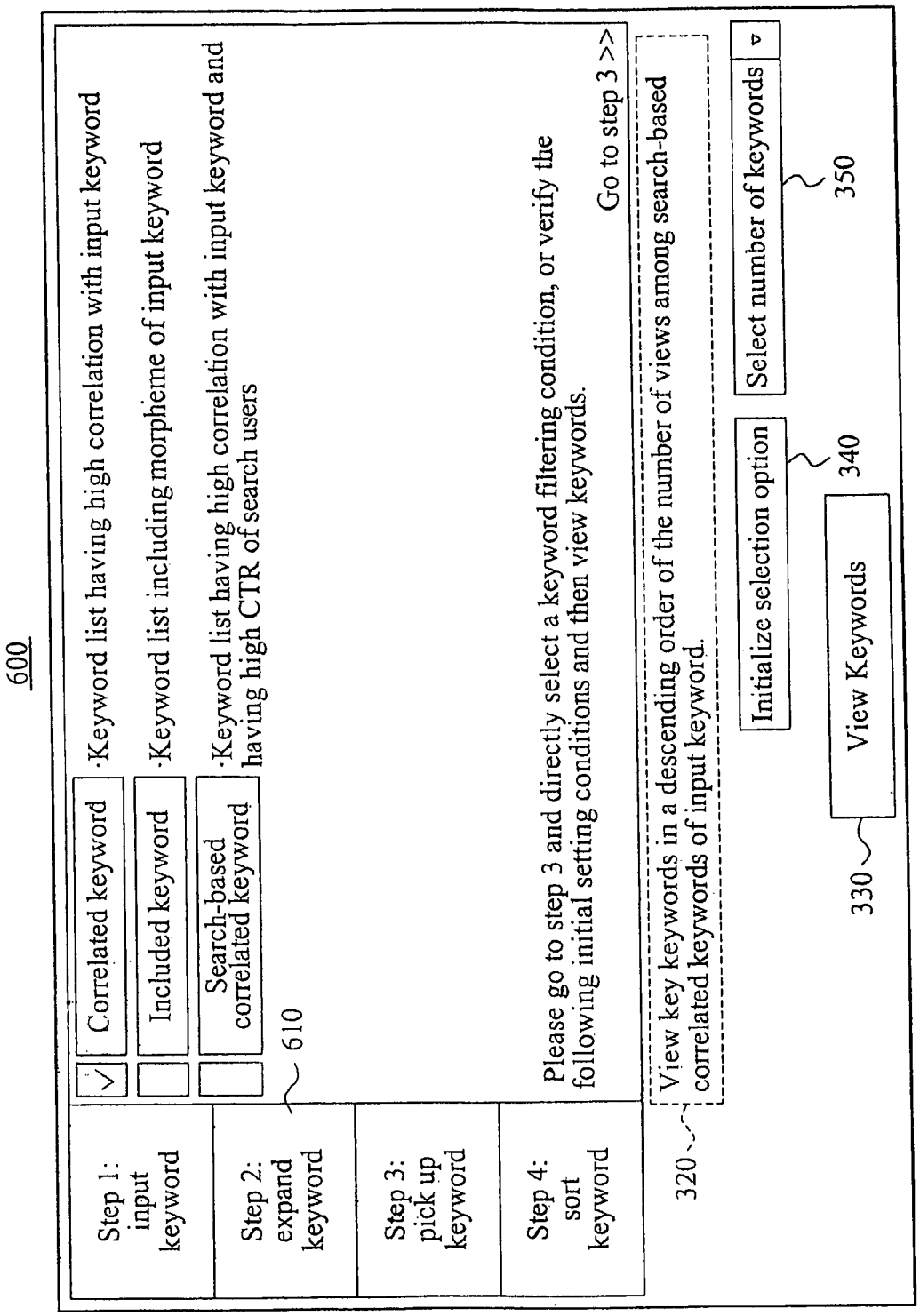
FIG. 6 illustrates a user interface to expand an input keyword according to an exemplary embodiment of the invention.

FIG. 6 illustrates a user interface to expand an input keyword according to an exemplary embodiment of the invention.

Screen 600 refers to an advertiser webpage in which an advertiser may modify a scope of a keyword used to retrieve or display an advertisement. In "step 2: expand keyword" 620, the advertiser may select at least one of an option "correlated keyword", an option "included keyword", and an option "search-based correlated keyword". Here, the option "correlated keyword" may be used to provide a keyword list having a high or a reference level of correlation with an input keyword, the option "included keyword" may be used to provide a keyword list including variations of the input keyword, and the option "search-based correlated keyword" may be used to provide a keyword list having a high or reference level of correlation with the input keyword and having a high or reference click through rate (CTR) of search users. Here, the keyword recommending system 200 of FIG. 2 may be used to expand the keyword. In this case, keywords input as shown in an example of FIG. 3, FIG. 4 or FIG. 5 may be used as the direct click keyword.

Figure 7:
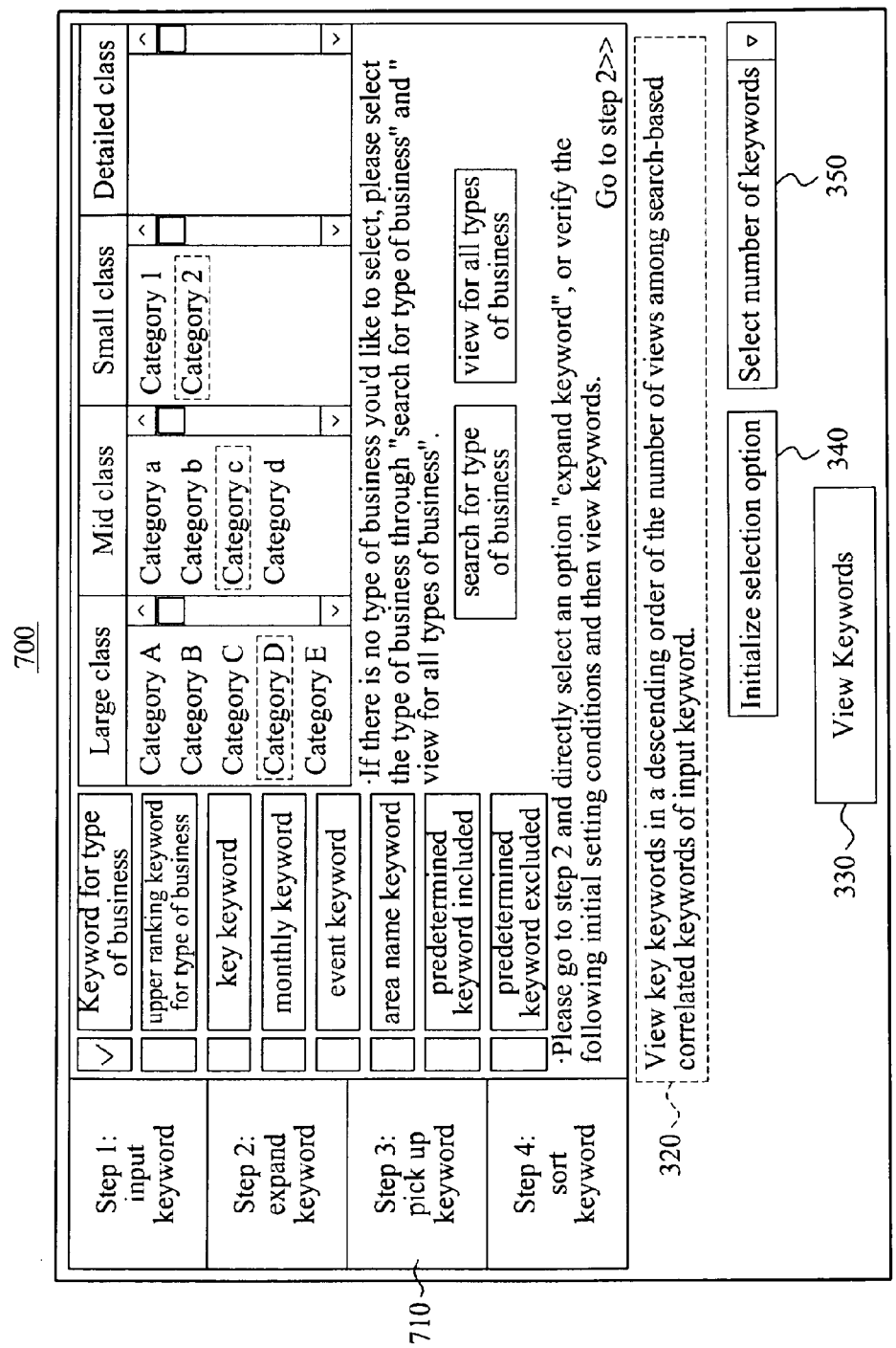
FIG. 7 illustrates a user interface to select a target keyword according to an exemplary embodiment of the invention.

FIG. 7 illustrates a user interface to select a target keyword according to an exemplary embodiment of the invention.

Screen 700 refers to an advertiser webpage in which an advertiser may modify a scope of a keyword used to retrieve or display an advertisement. In "step 3: pick up keyword" 710, the advertiser may select at least one of an option "keyword for type of business", an option "upper ranking keyword for type of business", an option "key keyword", an option "monthly keyword", an option "event keyword", an option "area name keyword", an option "predetermined keyword included", and an option "predetermined keyword excluded". Here, the screen 700 displays an example in which a user interface displays "large class/mid class/small class/detailed class" for the type of business if the advertiser selects the option "keyword for type of business". In this case, keywords associated with the type of business selected by the user among keywords expanded in "step 2: expand keyword" 610 of FIG. 6 may be viewed.

If the advertiser selects the option "upper ranking keyword", keywords that are generally used or used according to a reference level of frequency by an advertiser of the selected type of business may be viewed among the expanded keywords.

If the advertiser selects the option "key keyword", key keywords may be viewed among the expanded keywords. Here, the key keyword may indicate keywords of which a CTR and the number of clicks are greater than a reference value and of which the advertising effect is proved.

The advertiser may select a desired month using the option "monthly keyword". In this case, popular keywords having a high or reference number of views for a corresponding month may be viewed among the expanded keywords.

The advertiser may select a desired event from among reference events using the option "event keyword". In this case, keywords associated with the selected event may be viewed among the expanded keywords.

The advertiser may select a target area using the option "area name keyword". In this case, keywords associated with the selected area may be viewed among the expanded keywords. Here, one or more of lower ranking area names of the selected area may be included. In addition, the advertiser may be supported to select a plurality of areas.

The advertiser may input desired text using the option "predetermined keyword included". In this case, keywords including the input text may be viewed among the expanded keywords. For example, if the advertiser inputs "flower delivery", keywords "flower delivery service", "flower delivery price", "quick flower delivery", and the like may be viewed.

The advertiser may input desired text using the option "predetermined keyword excluded". In this case, a keyword corresponding to the input text or keywords including the input text may be excluded from the expanded keywords.

Figure 8:
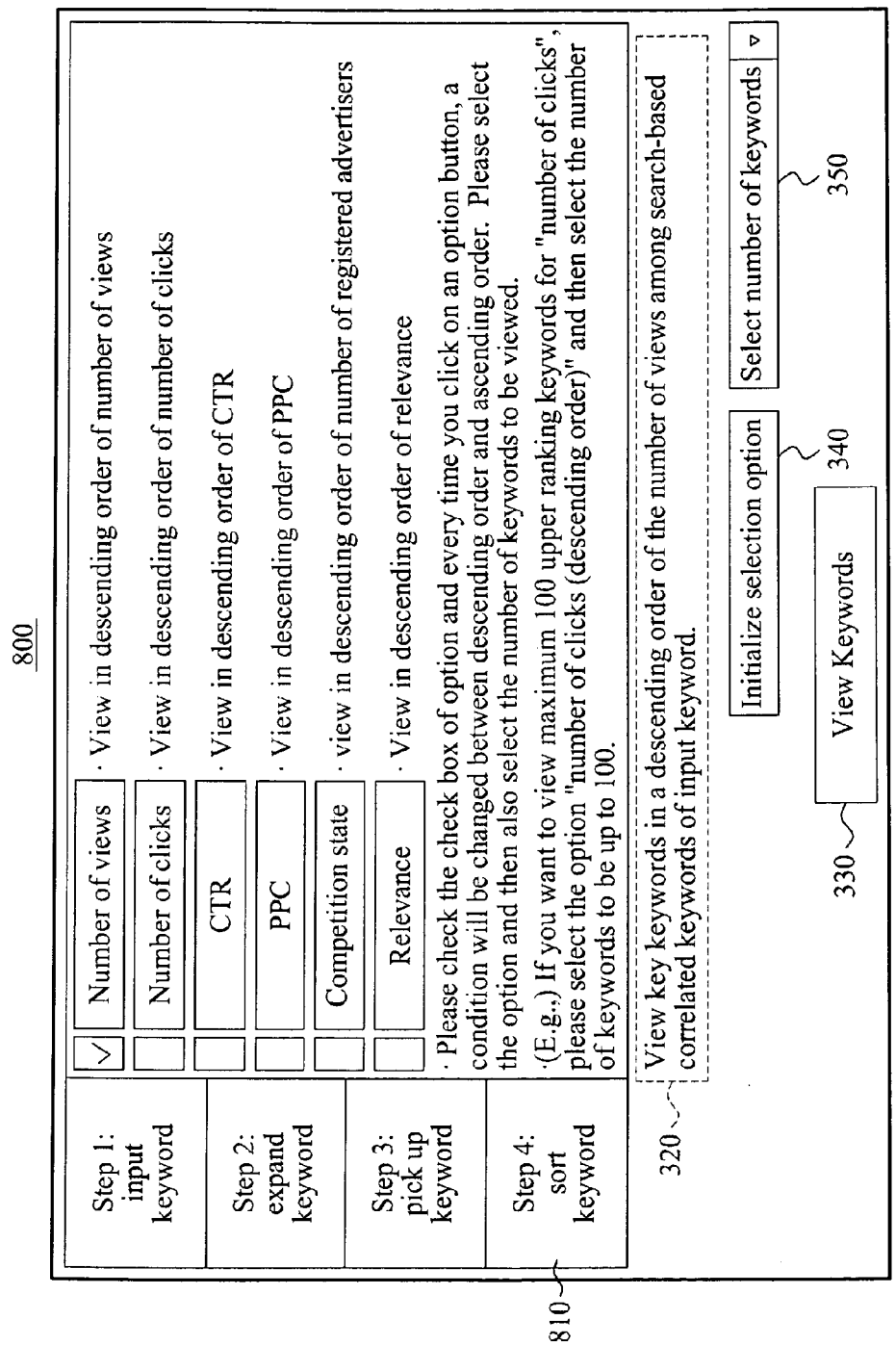
FIG. 8 illustrates a user interface to sort keywords based on various conditions according to an exemplary embodiment of the invention.

FIG. 8 illustrates a user interface to sort keywords based on various conditions according to an exemplary embodiment of the invention.

As shown in FIG. 8, screen 800 refers to an advertiser webpage in which an advertiser may modify a scope of a keyword used to retrieve or display an advertisement. In "step 4: sort keyword" 810, the advertiser may sort viewed keywords based on a number of views, a number of clicks, a CTR, a pay per click (PPC), a competition state, and a relevance with respect to the keywords. That is, the viewed keywords may be sorted in a descending or ascending order based on the number of views, the number of clicks, the CTR, the PPC, the number of registered advertisers, the relevance, and the like, by using an option provided from "step 4: sort keywords" 810.

A dotted box 320 shown in FIG. 3, FIG. 4, FIG. 5, FIG. 6, FIG. 7, and FIG. 8 shows keywords that are viewed according to various sorting conditions, based on one or more options selected by the advertiser. A default option may be present in each step and thus, even though the advertiser clicks on a "view keywords" button 330 without performing all of four steps, keywords may be viewed based on a default option.

An "initialize selection option" button 340 is a user interface to initialize selected options indicated in the dotted box 320. A "select number of keywords" button 350 is a user interface to receive a selection on the number of keywords to be viewed from the advertiser. For example, the advertiser may select the maximum number of keywords to be viewed, such as "up to maximum 100", "up to maximum 1000", and the like, using the "select number of keywords" button 350.

FIG. 9 illustrates a user interface to provide keywords to an advertiser according to an exemplary embodiment of the invention.

As shown in FIG. 9, screen 900 shows information of various keywords, viewed based on options selected by the advertiser, for various advertising products. Here, the advertiser may select a portion of the viewed keywords and store or exclude the selected viewed keywords as keywords of interest.

Figure 10:
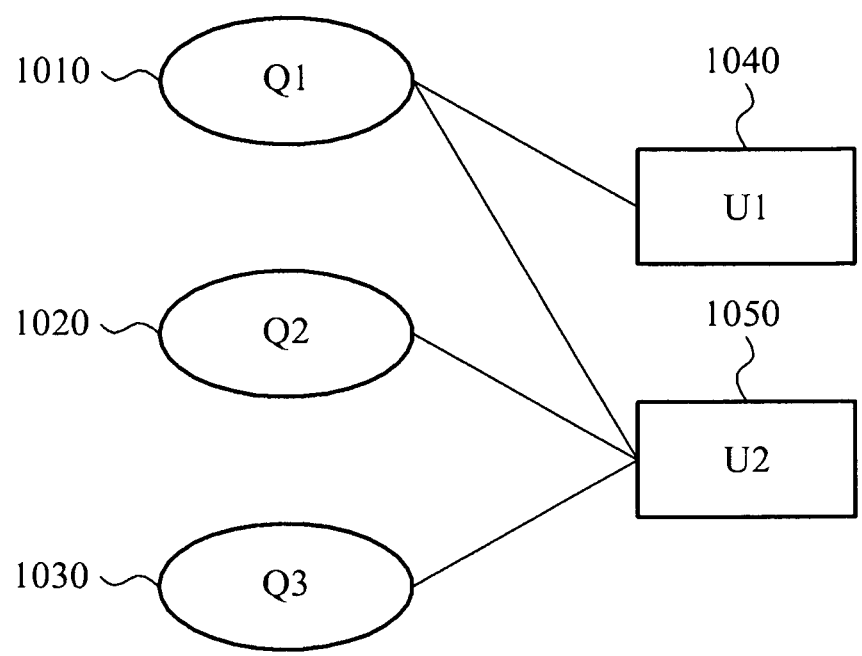
FIG. 10 is a diagram illustrating keywords and universal resource locators (URLs) according to an exemplary embodiment of the invention.

FIG. 10 is a diagram illustrating keywords and URLs according to an exemplary embodiment of the invention.

Referring to FIG. 10, Q1 1010, Q2 1020, and Q3 1030 may indicate three different keywords, and U1 1040 and U2 1050 may indicate two different URLs. Here, each of lines connecting the keywords and the URLs may indicate that a corresponding URL is selected or clicked by a user, who may have performed a search using a corresponding keyword.

Here, the following scenario 1, scenario 2, scenario 3, and scenario 4 will be described to obtain a probability that U1 1040 may be selected or clicked on with respect to each of Q1 1010, Q2 1020, and Q3 1030:

Scenario 1: If a user searching for the keyword Q1 1010 through a search window selects U1 1040, it may be assumed that a single user has made a vote for U1 1040 being suitable in the search result of Q1 1010.

Scenario 2: If it is assumed that 100 users have retrieved Q1 1010, and 50 users selected U1 1040 and the remaining 50 users selected U2 1050, a probability that a user having retrieved Q1 1010 may select each URL, that is U1 1040 and U2 1050, becomes 50%. Here, U1 1040 and U2 1050 may be URLs having a similar attribute and a probability thereof may become 50%.

Scenario 3: If a condition that U2 1050 is similar to U1 1040 with the probability of 50% is given, a conditional probability that the keywords Q2 1020 and Q3 1030 may be used to click on U2 1050 may be used to compute (probability that each of Q2 1020 and Q3 1030 may click on U2 1050× probability that U2 1050 is a URL having a similar attribute to U1 1040) the conditional probabilities that the respective corresponding keywords Q2 1020 and Q3 1030 is used to click on U1 1040 (respective probabilities that the respective corresponding Q2 1020 and Q3 1030 may click on U2 1050× probability that U2 1050 is a URL having a similar attribute to U1 1040).

Scenario 4: As shown in FIG. 10, Q2 1020 and Q3 1030 are not used for a direct click on U1 1040, but has a reference probability using another URL, U2 1050. URL U2 1050 is also clicked or selected using Q1 1010, which may be a keyword used to click on U1 1040. The keywords Q2 1020 and Q3 1030 having such probability may be referred to as "indirect click or indirect click keywords".

Figure 11:
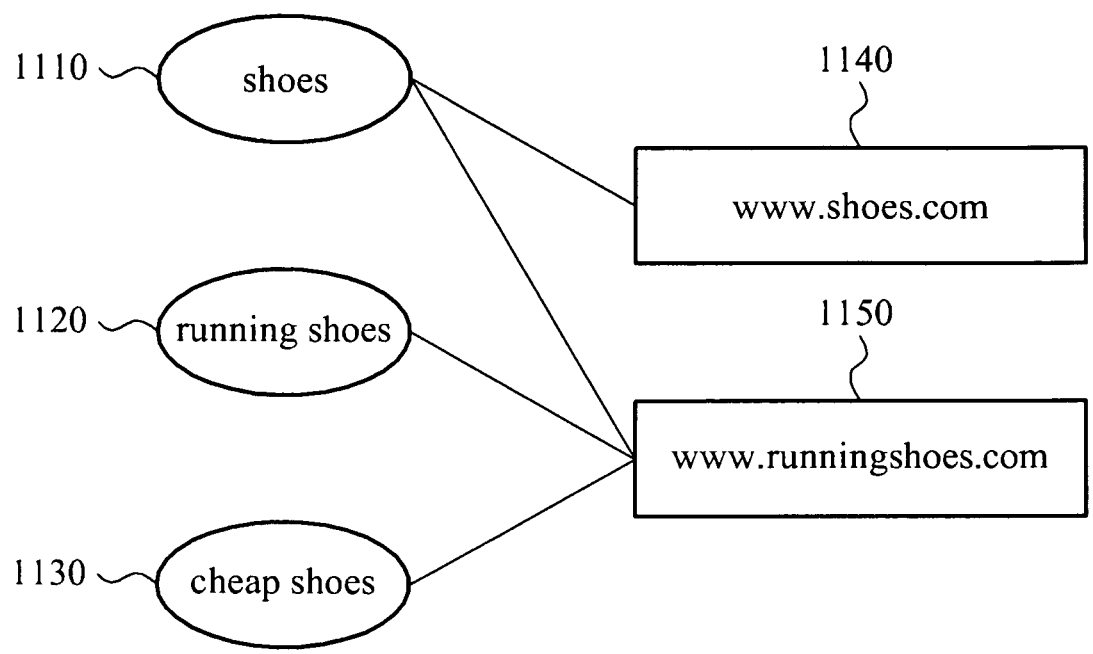
FIG. 11 is a diagram illustrating reference keywords and reference URLs according to an exemplary embodiment of the invention.

FIG. 11 is a diagram illustrating reference keywords and reference URLs according to an exemplary embodiment of the invention.

FIG. 11 shows "shoes" 1110, "running shoes" 1120, and "cheap shoes" 1130 as keywords, and "www.shoes.com" 1140 and "www.runningshoes.com" 1150 as URLs. Here, one or more lines connecting the keywords and the URLs may indicate that a corresponding URL is selected or clicked by a user, who may have performed a search using a corresponding keyword.

Here, a probability that the URL "www.shoes.com" 1140 may be selected or clicked on with respect to each of the keywords "shoes" 1110, "running shoes" 1120, and "cheap shoes" 1130 may be computed as follows.

If PQ[x] is a probability that "www.shoes.com" 1140 may be selected using a keyword x, and if PU[y] is a probability that a URL y may be similar to "www.shoes.com" 1140, PU[www.shoes.com]=1, and PU[www.runningshoes.com]=0.

As a first step, the probability that the URL "www.shoes.com" 1140 may be selected with respect to the keywords "shoes" 1110, "running shoes" 1120, and "cheap shoes" 1130 may be computed as follows:

$$PQ[shoes]=\frac{1}{2}*PU[www.shoes.com]+\frac{1}{2}*PU[www.runningshoes.com]=\frac{1}{2}*1+\frac{1}{2}*0=\frac{1}{2}$$

$$PQ[running\ shoes]=0(no\ line\ connected)*PU[www.shoes.com]+1*PU[www.runningshoes.com]=0*1+1*0=0$$

$$PQ[cheap\ shoes]=0(no\ line\ connected)*PU[www.shoes.com]+1*PU[www.runningshoes.com]=0*1+1*0=0$$

Accordingly, the result of the first step may follow as:
PU[www.shoes.com]=1
PU[www.runningshoes.com]=0
PQ[shoes]=½
PQ[running shoes]=0
PQ[cheap shoes]=0

As a second step, a similarity probability between each of "www.shoes.com" 1140 and "www.runningshoes.com" 1150 and an original destination "www.shoes.com" 1140 may be computed as follows:
PU[www.shoes.com]=PQ[shoes](only the keyword "shoes" 1140 is connected to "www.shoes.com" 1140)=½, however, an original value of PU[www.shoes.com] is "1" and thus, since "1" is greater than a newly obtained value "½", the original value of "1" becomes a value of PU[www.shoes.com].

$$PU[www.runningshoes.com]=PQ[shoes]*\frac{1}{3}+PQ[running\ shoes]*\frac{1}{3}+PQ[cheap\ shoes]*\frac{1}{3}=\frac{1}{2}*\frac{1}{3}+0*\frac{1}{3}+0*\frac{1}{3}=\frac{1}{6}$$

Accordingly, the result of the second step may follow as:
PU[www.shoes.com]=1
PU[www.runningshoes.com]=⅙
PQ[shoes]=½
PQ[running shoes]=0
PQ[cheap shoes]=0

The more accurate probability may be obtained by repeatedly performing the above first step and second step.

For example, as a third step of repeating the first step, the selection probability that "www.shoes.com" 1140 may be selected with respect to each of keywords "shoes" 1110, "running shoes" 1120, and "cheap shoes" 1130 may be computed as follows:

$$PQ[shoes]=\frac{1}{2}*PU[www.shoes.com]+\frac{1}{2}*PU[www.runningshoes.com]=\frac{1}{2}*1+\frac{1}{2}*\frac{1}{6}=\frac{7}{12}$$

$$PQ[running\ shoes]=1*PU[www.runningshoes.com]=1*\frac{1}{6}=\frac{1}{6}$$

$$PQ[cheap\ shoes]=1*PU[www.runningshoes.com]=1*\frac{1}{6}=\frac{1}{6}$$

Accordingly, the result of the third step may follow as:
PU[www.shoes.com]=1
PU[www.runningshoes.com]=⅙
PQ[shoes]=7/12
PQ[running shoes]=⅙
PQ[cheap shoes]=⅙

As a fourth step of repeating the second step, the association probability between each of "www.shoes.com" 1140 and "www.runningshoes.com" 1150 and the original destination "www.shoes.com" 1140 may be computed as follows:
PU[www.shoes.com]=1

$$PU[www.runningshoes.com]=PQ[shoes]*\frac{1}{3}+PQ[running\ shoes]*\frac{1}{3}+PQ[cheap\ shoes]*\frac{1}{3}=\frac{7}{12}*\frac{1}{3}+\frac{1}{6}*\frac{1}{3}+\frac{1}{6}*\frac{1}{3}=\frac{11}{36}$$

Accordingly, the result of the step 4 may follow as:
PU[www.shoes.com]=1
PU[www.runningshoes.com]=11/36
PQ[shoes]=7/12
PQ[running shoes]=⅙
PQ[cheap shoes]=⅙

For example, even though the keywords "running shoes" 1120 and "cheap shoes" 1130 are not used to select "www.shoes.com" 1140, selection probabilities that "www.shoes.com" 1140 may be selected with respect to the keywords "running shoes" 1120 and "cheap shoes" 1130 may be higher than the selection probabilities that "www.shoes.com" 1140 may be selected with respect to other keywords. In this case, the keywords "running shoes" 1120 and "cheap shoes" 1130 may be selected to be recommended to a user or an advertiser. Therefore, with respect to a keyword set A that leads to many clicks on a URL, for example, "www.shoes.com" in which the user or the advertiser is interested, a keyword set B that leads to many clicks on URLs clicked on using keywords included in the keyword set A may be found.

The following Table 1, Table 2 and Table 3 show a keyword view result according to conventional correlated keyword logic and a keyword view result according to an exemplary embodiment of the invention with respect to a reference keyword. As shown in Table 1, Table 2, and Table 3, with respect to an input keyword "Jeonju's famous restaurant", it may be possible to recommend keywords more suitable or closely matched to an advertising intent of an advertiser using the keyword view result according to the exemplary embodiment of the invention.

TABLE 1

| Input keyword | Keyword view result according to exemplary embodiment | Keyword view result according to conventional art |
| --- | --- | --- |
| Jeoju's famous restaurant | Jeonju's famous restaurant | Bean sprout soup |
| | Jeonju's gamja tang | Bean sprout soup with rice |
| | Jeonju's famous pork intestine house | Jeonju's bean sprout soup |
| | Jeonju's soondae and boiled rice serviced in soup | Hangover soup |
| | Haji dish | Gukbap |
| | Jeonju's famous bibimbap restaurant | Bibimbap |
| | Jeonju bibimbap | Jeonju dish |
| | Jeonju bibimbap recipe | Bibimbap |
| | Jeonju's stone bibimbap | Jeonju bibimbap |
| | Food travel to Jeonla-do | Traditional dish |
| | Jeonbuk's special product | Starting cafeteria |
| | Original Jeonju bibimbap | Starting restaurant |
| | Jeonju bibimbap recipe | Restaurant |
| | Jeonlado's food story | Cafeteria |
| | Jeonju bibimbap recipe | Meat broth |
| | . . . | . . . |

TABLE 2

| Input keyword | Keyword view result according to exemplary embodiment | Keyword view result according to conventional art |
| --- | --- | --- |
| Tattoo removal | Tattoo removal | Tattoo removal |
| | Tattoo eraser | Botox |
| | Tattoo removal Busan | Place offering cheap Botox |
| | Tattoo erasing | Breast surgery |
| | How to erase eye line tattoo | Plastic surgery |
| | Semi-permanent removal for eye line | Hair implant |
| | Price of tattoo removal | Correcting hair line |
| | Erasing tattoo | Hair implant specialized hospital |
| | Removing eyeliner tattoo | Hair line |
| | Lettering removal | Apgoojung plastic surgery |
| | Daegu tattoo removal | Gangnam plastic surgery |
| | Clean tattoo Clinique | Filler |
| | Tattoo Clinique | Hair implant hospital |
| | Tattoo removal method | Permanent depilation |
| | Medi-S clean tattoo | Wrinkle removal |
| | Hongdae clean tattoo | Eyebrow implant |
| | Removing tattoo | Hair implant surgery |
| | Tattoo erasing | Brow line |
| | How to erase eyebrow tattoo | Female hair implant |
| | . . . | . . . |

TABLE 3

| Input keyword | Keyword view result according to exemplary embodiment | Keyword view result according to conventional art |
| --- | --- | --- |
| Korea pottery | Korea pottery | Korea pottery |
| | British born china | Fusion style hanbok |
| | Korea pottery souvenir | Hanbok rental |

TABLE 3-continued

| Input keyword | Keyword view result according to exemplary embodiment | Keyword view result according to conventional art |
| --- | --- | --- |
| | Born china palace silver | Hanbok rental specialty store |
| | Dream home set | Hanbok dress |
| | Korea pottery super-strong | Wedding exhibition |
| | Factory outlet | Wedding consulting |
| | Korea pottery modern platinum | Wedding show |
| | Returned dish | Wedding fair |
| | Christmas pottery | Samsung delight |
| | Shinla silver spoon | Samsung mariae |
| | E shop | Wedding present |
| | Korea pottery festival | Wedding home appliance |
| | Born china dish | Clothes for honeymoon |
| | Genzo dish | Wedding coordinator |
| | Korea pottery cup | Samsung delight wedding fair |
| | Born china home set | Wedding car coordination |
| | Korea pottery wedding march | Rending hanbok |
| | Dish set for children | Dress rental |
| | . . . | . . . |

Figure 12:
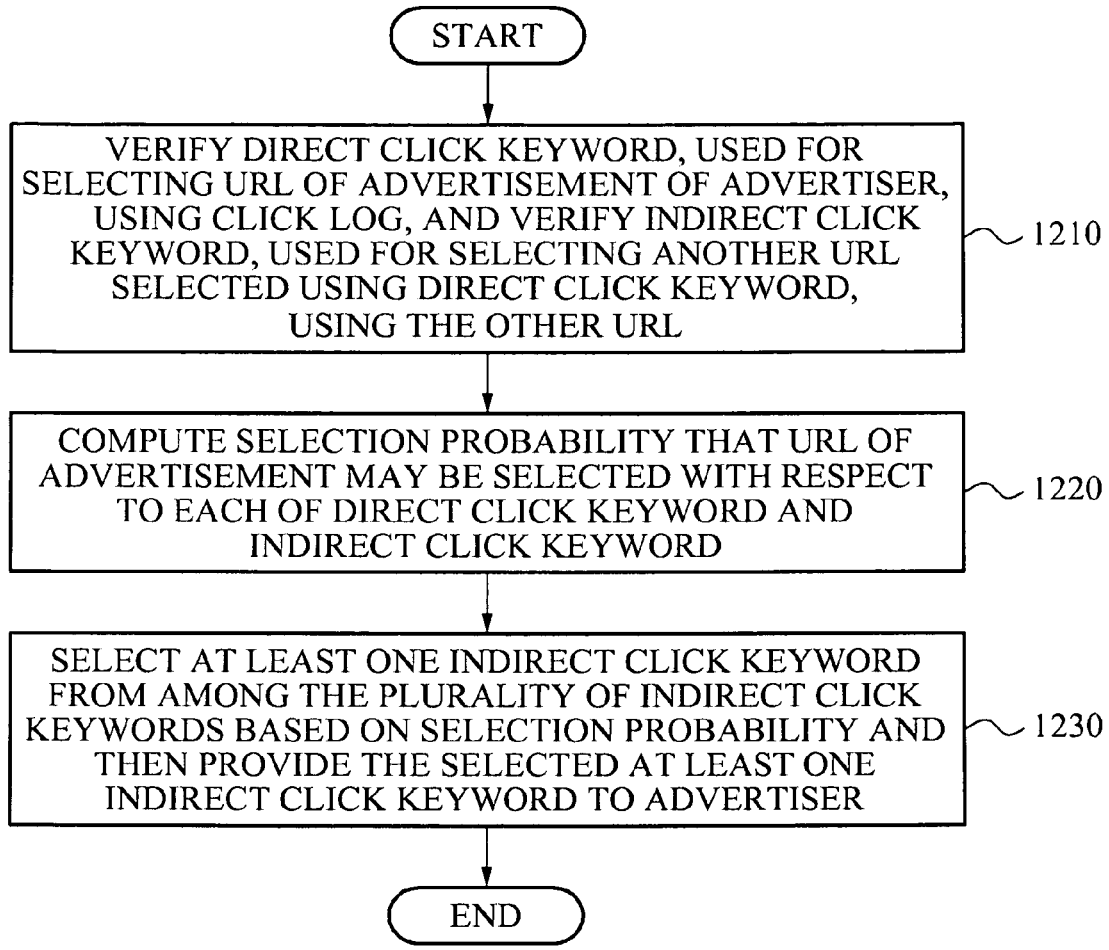
FIG. 12 is a flowchart illustrating a method for recommending a keyword according to an exemplary embodiment of the invention.

FIG. 12 is a flowchart illustrating a method for recommending a keyword according to an exemplary embodiment of the invention.

The keyword recommending method will be described as if the method is performed by the keyword recommending system 200 of FIG. 2 but is not limited thereto.

In operation 1210, the keyword recommending system 200 may determine a direct click keyword by referring to a click log to determine whether the keyword was associated with the advertisement of the advertiser. The keyword recommending system 200 may also verify or determine an indirect click keyword, which is verified or determined using a URL that does not correspond to the advertisement of the advertiser if using the direct click keyword. The direct click keyword may also be used to select a URL corresponding to an advertisement of the advertiser or a first URL and the indirect click keyword may be used to select a different URL or a second URL, which may not correspond to the advertiser. The indirect click keyword may include at least one keyword among remaining keywords, excluding the direct click keyword.

For example, the keyword recommending system 200 may verify or determine, as the direct click keyword by using or referring to the click log. More specifically, the direct click keyword may refer to a keyword corresponding to the URL of the advertisement, which is selected by a searcher as a search result. Here, the keyword recommending system 200 may verify or determine URLs corresponding to the direct click keyword by referring to the click log, and may verify or determine other keywords used to select the verified URLs.

That is, the direct click keyword may indicate a keyword used to select the URL of the advertisement of the advertiser or a first URL. The indirect click keyword may indicate a keyword that is not used to select the URL of the advertisement, but rather used to select a different URL or a second URL. The second URL may have a similar attribute to the first URL. The second URL may be an advertisement of a different advertiser or source. Further, the direct click keyword may also be used to select the URL of an advertisement that does not belong to the advertiser, or a third URL. In other words, there may be some probability that the indirect click keyword may be used to select the URL of the advertisement of the advertiser or a fourth URL.

In operation 1220, the keyword recommending system 200 may compute a selection probability of the URL of the advertisement being selected with respect to the direct click keyword and the indirect click keyword. The keyword recommending system 200 may compute probabilities of corresponding keywords used to select the URL of the advertisement of the advertiser. As the selection probability for the direct keyword increases, the advertising performance of the advertisement may further increase.

The keyword recommending system 200 may compute the selection probability based on a rate the first URL and the second URL being selected with respect to the direct click keyword and the indirect click keyword. Further, the probability computing unit 220 may compute a similarity probability between the first URL and the second URL. Here, the similarity probability may be computed based on a rate the first URL and the second URL that are selected by a plurality of searchers using the same or similar keywords. The rate at which the first URL and the second URL are selected may be determined by using or referring to the click log.

For example, if 100 searches were determined to have been performed using the same keyword A, based on a click log, and if 50 searchers select a first URL, and the remaining 50 searchers select a second URL, a probability that a searcher who performs search using the keyword A selects the first URL or the second URL may be 50%. That is, a probability that the first URL is similar to the second URL may be 100%. A similarity probability between URLs that cannot be simultaneously selected using any keyword may be 0%. That is, the keyword recommending system 200 may compute the selection probability that the first URL may be selected with respect to the direct click keyword and the indirect click keyword. The respective selection probability may be based on the similarity probability between the first URL and the second URL, and a rate of URL that is selected with respect to the direct click keyword and the indirect click keyword.

The keyword recommending system 200 may include and thereby perform, in operation 1220, a third operation of repeating a first operation (not shown) of computing the selection probability based on the rate of the first URL and the second URL that are selected with respect to the direct click keyword and the indirect click keyword, and compute a similarity probability between the first URL and the second URL. A second operation (not shown) update the similarity probability based on the selection probability computed in the first operation, so that the first operation and the second operation may be repeatedly performed a reference number of times.

That is, instead of terminating a computation if the selection probability is computed in the first operation, it may be possible to re-compute the selection probability using the updated similarity probability by controlling the first operation to be repeated in the third operation if the similarity probability is updated based on the selection probability through the second operation.

A selection probability that a reference URL may be selected with respect to a keyword is described above with reference to FIG. 10 and FIG. 11 and thus, further detailed description related thereto will be omitted here.

In operation 1230, if a plurality of indirect click keywords is verified, the keyword recommending system 200 may select at least one indirect click keyword based on the selection probability and then provide or recommend the selected indirect click keyword to the advertiser. For example, the keyword recommending system 200 may select a reference number of indirect click keywords and provide the selected number of indirect click keywords in a descending order of selection probability. The reference number of indirect click keywords may be provided by the keyword recommending system 200 or the advertiser. Here, information associated with the direct click keyword and the indirect click keyword may be displayed on an advertiser webpage assigned to the advertiser. Providing of the indirect click keyword is described above with reference to FIG. 9.

As described above, the selection probability may indicate probabilities of corresponding keywords used to select the URL of the advertisement and thus, the advertising effect may increase according to an increase in the selection probability.

Figure 13:
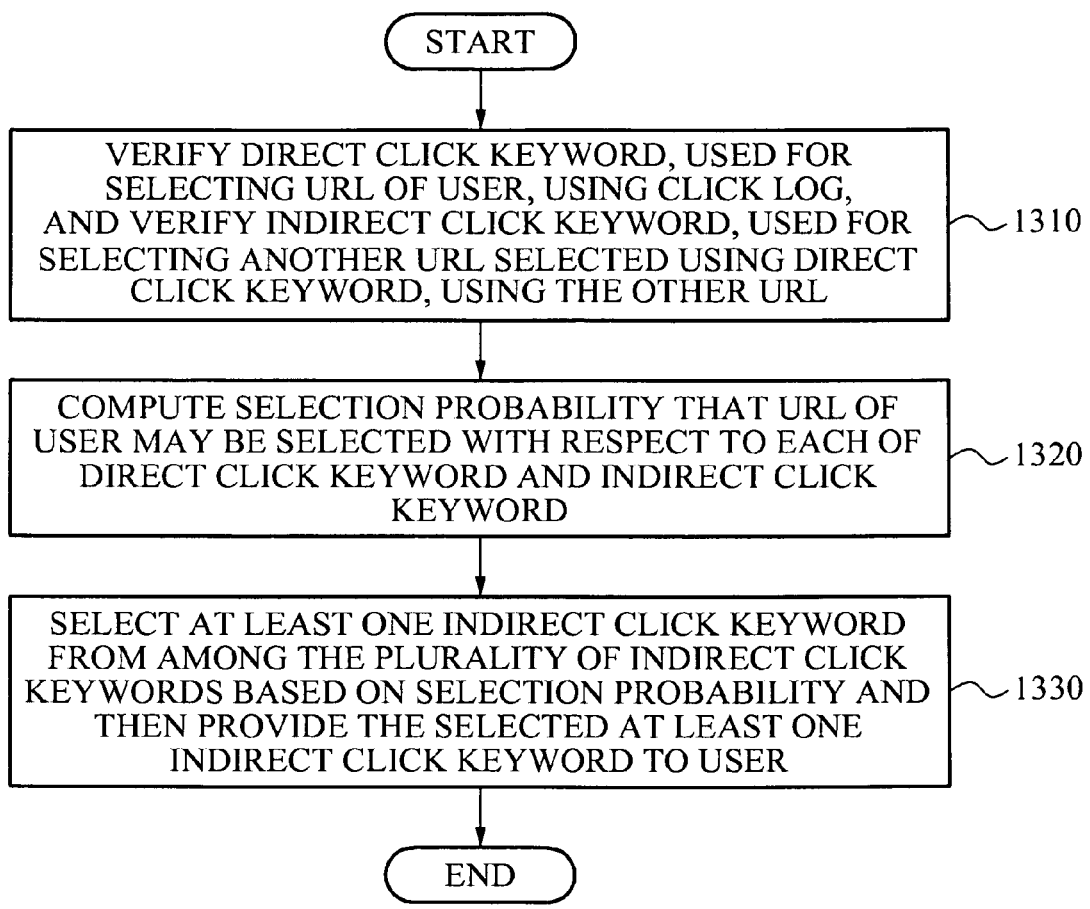
FIG. 13 is a flowchart illustrating a method for recommending a keyword according to an exemplary embodiment of the invention.

FIG. 13 is a flowchart illustrating a method for recommending a keyword according to an exemplary embodiment of the invention.

The keyword recommending method of FIG. 13 is described as being performed by the keyword recommending system of FIG. 2 but is not limited thereto. The keyword recommending method according to the exemplary embodiment may recommend a keyword for an advertiser and general users using a search service.

In operation 1310, the keyword recommending system 200 may verify or determine a direct click keyword by referring to a click log to determine whether the keyword was associated with a URL of a user. The keyword recommending system 200 may also verify or determine an indirect click keyword, which is verified or determined using a URL that does not correspond to the URL of the user using the direct click keyword. The direct click keyword may also be used to select a URL of a user. The indirect click keyword may be used to select a different URL that does not correspond to the URL of the user. Here, the URL of the user may include at least one of a URL input from the user and/or a URL selected by the user. The URL that does not correspond to the URL of the user may include a URL input from a different user/source and/or a URL selected by the different user/source. For example, if a user A receives a search result in response to a search using a keyword B and then selects a URL from the search result, the keyword recommending system 200 may verify or determine the selected URL as the URL associated with the user and verify or determine selection of the URL is associated with the direct click keyword by using or referring to the click log. If user A selects a different URL, one that does not correspond to the user, then the keyword recommending system 200 may determine that the selected URL is associated with the indirect click keyword. Further, the direct click keyword may also be verified or determined as the keyword inputted by the user, without the use of the click log.

In operation 1320, the keyword recommending system 200 may compute a selection probability that the URL of the user may be selected with respect to the direct click keyword and the indirect click keyword. The keyword recommending system 200 may compute the selection probability based on a rate of the first URL and the second URL that are selected with respect to the direct click keyword and the indirect click keyword, and a similarity probability between the URL of the user or fifth URL and the URL of a different user/source or a sixth URL.

Here, the keyword recommending system 200 may include and thereby perform, in operation 1320, a first operation (not shown) of computing the selection probability based on the rate of the fifth URL and the sixth URL that are selected with respect to the direct click keyword and the indirect click keyword, and compute a similarity probability between the fifth URL and the sixth URL. A second operation (not shown) may update the similarity probability based on the selection probability computed in the first operation. Further, in operation 1320, a third operation (not show) of repeating the first operation and the second operation may be executed so that computation of the selection probability and updating of the similarity probability may be repeated a reference number of times.

A method for computing the selection probability that the reference URL may be selected with respect to a keyword is described above and is further described with reference to FIG. 10 and FIG. 11 and thus, further detailed description related thereto will be omitted here.

In operation 1330, the keyword recommending system 200 may provide the indirect click keyword. If a plurality of indirect click keywords is verified, the keyword recommending system 200 may select at least one indirect click keyword from among the plurality of indirect click keywords based on the selection probability and then provide or recommend the selected indirect click keyword to the user. For example, the keyword recommending system 200 may select a reference number of indirect click keywords and provide the selected number of indirect click keywords in a descending order of selection probability. The reference number of indirect click keywords may be provided by the keyword recommending system 200 or the advertiser.

As described above, according to exemplary embodiments of the invention, it may be possible to discover keywords, which have been missed by a reference URL, by computing a probability that the reference URL may be selected. For example, reference URL may be clicked on with respect to one or more keywords that have been used for a direct click on the reference URL. Also, it may be possible to discover keywords by computing the probability with respect to one or more keywords that have not been used for the direct click keyword on the reference URL through a similar website corresponding to the reference URL, and by extracting or recommending the corresponding keywords based on the computed probability. Also, it may be possible to enhance the advertising effect and advertising earnings by recommending a keyword of which the computed probability is at least a reference level. In addition, it may be possible to analyze various types of keywords with a reference level of probability to be used for a reference URL.

The exemplary embodiments according to the invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to recommend a keyword implemented with a computer, the system comprising:
   a verifying unit configured to verify whether the keyword is a direct click keyword by determining, referring to a click log, whether the keyword is associated with a first universal resource locator (URL) of an advertisement of an advertiser, and verify whether the keyword is an indirect click keyword by determining that the keyword does not locate the first URL but locates a second URL having an attribute similar to the first URL;
   a keyword recommending unit configured to recommend the determined indirect click keyword; and
   a probability computing unit configured to compute selection probabilities that the first URL is selected using the direct click keyword and the indirect click keyword,
   wherein the keyword recommending unit is configured to select at least one indirect click keyword having a corresponding one of the selection probabilities greater than zero from among the plurality of indirect click keywords and is configured to provide the selected at least one indirect click keyword to the advertiser, and
   the probability computing unit includes,
      a computing unit configured to compute the selection probabilities based on selection rates of the first URL and the second URL with respect to the direct click keyword and the indirect click keyword, and a similarity probability between the first URL and the second URL, and
      an updating unit configured to update the similarity probability based on the selection probabilities.

2. The system of claim 1, wherein the probability computing unit computes the selection probabilities based on selection rates of the first URL and the second URL with respect to the direct click keyword and the indirect click keyword, and a similarity probability between the first URL and the second URL.

3. The system of claim 2, wherein:
   the similarity probability is computed based on a rate of the first URL and the second URL selected by a plurality of searchers using the same keyword, and
   the rate is determined based on the click log.

4. The system of claim 1, wherein the probability computing unit further comprises:
   a control unit configured to control the computing unit, wherein the updating unit repeats computation of the selection probabilities and updates the similarity probability.

5. The system of claim 1, wherein the keyword recommending unit selects a reference number of indirect click keywords and provide the selected number of indirect click keywords in a descending order of selection probability.

6. The system of claim 1, wherein the indirect click keyword comprises at least a keyword among remaining keywords excluding the direct click keyword used to select the first URL.

7. The system of claim 1, wherein information associated with the direct click keyword and the indirect click keyword is displayed on an advertiser webpage assigned to an advertiser.

8. The system of claim 1, wherein the first URL corresponds to a URL of an advertisement belonging to an advertiser, the second URL corresponds to a URL of a first different advertisement, and the third URL corresponds to a URL of a second different advertisement.

9. The system of claim 1, wherein the first URL corresponds to a URL of a user, the second URL corresponds to a first different user, and the third URL corresponds to a second different user.

10. The system of claim 1, wherein the verifying unit is configured to verify whether the keyword is the indirect click keyword by further determining that the keyword does not belong to the click log of the direct keyword.

11. A method for recommending a keyword, the method comprising:
   determining whether the keyword is a direct click keyword by determining, referring to a click log, whether the keyword is associated with a first universal resource locator (URL) of an advertisement of an advertiser;

determining whether the keyword is an indirect click keyword by determining that the keyword does not locate the first URL but locates a second URL having an attribute similar to the first URL;

recommending the determined indirect click keyword; and computing selection probabilities that the first URL is selected using the direct click keyword and the indirect click keyword, wherein the recommending selects at least one indirect click keyword having a corresponding one of the selection probabilities greater than zero from among the plurality of indirect click keywords and then provides the selected at least one indirect click keyword to a user, and the computing includes,
  computing the selection probabilities based on selection rates of the first URL and the second URL with respect to the direct click keyword and the indirect click keyword, and a similarity probability between the first URL and the second URL, and
  updating the similarity probability based on the selection probabilities.

12. The method of claim 11, wherein:

the similarity probability is computed based on a rate of the first URL and the second URL selected by a plurality of searchers using the same keyword, and the rate is determined by referring to the click log.

13. The method of claim 11, further comprising:

repeating computation of the selection probability; and updating the similarity probabilities.

14. The method of claim 11, further comprising:

selecting a reference number of indirect click keywords; and providing the selected number of indirect click keywords in a descending order of selection probabilities.

15. The method of claim 11, wherein the first URL comprises at least one of a URL input from the user and a URL selected by the user.

16. A method for recommending a keyword, the method comprising:

determining whether a keyword is a direct click keyword by determining, referring to a click log, whether the keyword is associated with a first universal resource locator (URL) of an advertisement of an advertiser;

determining whether the keyword is an indirect click keyword by determining that the keyword does not locate the first URL but locates a second URL having an attribute similar to the first URL;

computing selection probabilities that the direct and indirect keywords are used for selecting the first URL or the second URL with the computing device based on selection rates of the first URL and the second URL with respect to the direct click keyword and the indirect click keyword;

computing a similarity probability between the first URL and a second URL with the computing device;

updating the similarity probability based on the selection probabilities; and selecting and recommending a target indirect keyword having a corresponding one of the selection probabilities greater than zero from a plurality of indirect click keywords.

* * * * *